J. DUNN.
T-PIPE AND PLUG FOR HEATING SYSTEMS
APPLICATION FILED AUG. 26, 1910.
998,843.
Patented July 25, 1911.
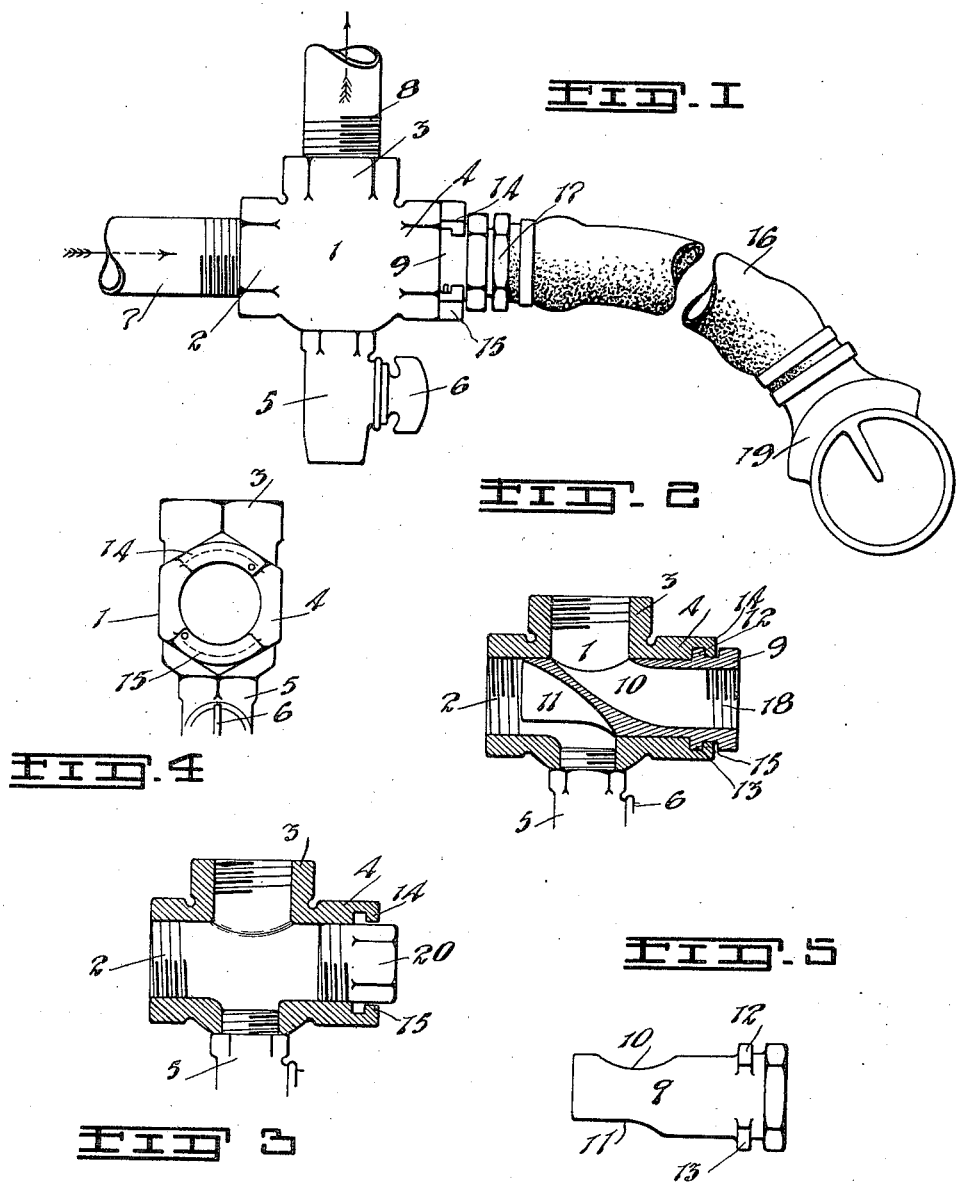
WITNESSES
INVENTOR
JOHN. DUNN
By _____ Atty

UNITED STATES PATENT OFFICE.

JOHN DUNN, OF WINNIPEG, MANITOBA, CANADA.

T PIPE AND PLUG FOR HEATING SYSTEMS.

998,843. Specification of Letters Patent. Patented July 25, 1911.

Application filed August 26, 1910. Serial No. 579,106.

*To all whom it may concern:*

Be it known that I, JOHN DUNN, of the city of Winnipeg, in the Province of Manitoba, Canada, have invented certain new and useful Improvements in T Pipes and Plugs for Heating Systems, of which the following is the specification.

My invention relates to an improved T pipe and plug used particularly in connection with railroad hot water heating systems, and the object of the invention is to provide a T pipe and plug which will allow the heating system to be flushed out or cleaned readily when desired.

It consists essentially in a T-pipe having a waste or drip pipe secured thereto and a plug insertible within the pipe and provided with an internal duct and a groove, the parts being arranged and constructed as hereinafter more particularly described.

Figure 1 is a side elevation of my invention showing a hose attached. Fig. 2 is a vertical sectional view centrally through the T-pipe and the insertible plug. Fig. 3 is a vertical sectional view centrally through the T-pipe showing a screw plug which is inserted when the other is removed. Fig. 4 is an end view of the T-pipe with the plug removed. Fig. 5 is a side elevation of the plug shown in section in Fig. 2.

In the drawing like characters of reference indicate corresponding parts in each figure.

1 represents my T-plug having the three arms, 2, 3 and 4, and provided with a drip pipe 5 directly opposite the arm 3, the drip pipe being supplied with a stop cock 6. The drip pipe is screwed into the T-pipe in the usual way.

7 and 8 are pipes screwed respectively to the arms 2 and 3 of the T-pipe which pipes form part of the ordinary hot water heating system of the car, the water circulating through the T-pipe when the car is being heated in the direction indicated by the arrows in Fig. 1.

9 is a plug insertible and turnable within the T-pipe, which plug is provided with an internal duct 10 which passes from the outer end to the side thereof and further with a groove 11 at the inner end. The duct communicates with the pipe 8 and the groove connects the pipe 7 with the drip pipe 5 when the plug is in its final position.

Lips 12 and 13 are provided on the plug which are designed to pass behind extending lugs 14 and 15 extending from the T-pipe. The plug is finally placed in position by turning it a quarter turn as will be readily understood. A hose 16 is connected to the plug by screwing the threaded end 17 thereof into the internal threaded end 18 of the plug.

19 is the usual coupling head attached to the hose.

When it is not desired to flush the heating system the plug 9 is removed from the T-pipe by disengaging the lips with the lugs and withdrawing it. A second screw plug 20 is then threaded into the arm 4 of the T-pipe closing the opening and providing water from steam.

When the heating system is to be flushed the plug 20 is removed and the plug 9 is inserted and turned to the position shown best in Fig. 2. Water is then forced through the hose 16 and it is directed by the duct 10 to the pipe 8 where it passes through the system and returns by way of the pipe 7 where it enters the groove 11 and is discharged through the drip pipe, a stop cock being open.

What I claim as my invention is:—

1. The combination comprising a T-pipe having three arms with openings therein, a drip pipe communicating with the T-pipe, a plug insertible within the T-pipe and provided with a duct and a groove, said duct connecting openings in two of the arms and the groove connecting the opening in the remaining arm with the drip pipe, as and for the purpose specified.

2. The combination comprising a T-pipe provided with three arms having communicating openings therein, all of said openings being provided with interior threads, a drip pipe connected with a T-pipe, a removable and turnable plug within the T-pipe provided with a duct and a groove, said duct connecting two of the openings in the pipe, and the said groove connecting the opening in the remaining pipe with the drip pipe and means for securing the plug in position, as and for the purpose specified.

3. The combination with a T-pipe provided with a drip pipe, of a plug insertible within the pipe, said plug being provided with a duct passing inwardly through the one end and outwardly at the side and with a groove at the opposite end, as and for the purpose specified.

4. The combination with a T-pipe provided with the usual three-way opening and with a drip pipe communicating therewith, of a plug insertible within the T-pipe through one of the openings, provided with a duct and a groove, the duct communicating with one of the openings in the T-pipe and the groove connecting the other of the openings in the pipe and the drip pipe, and a hose connected to the plug, as and for the purpose specified.

5. The combination with a pair of water carrying pipes of a heating system, of a T-pipe having the usual threaded openings therein, two of which receive the water pipe, a drip pipe secured to the T-pipe directly opposite one of the water pipes, and a plug insertible within the other of the openings directly opposite the other water pipe, said plug being provided with a duct communicating with one of the water pipes and with a groove which connects the other of the water pipes with the drip pipe, and means for retaining the plug within the T-pipe, as and for the purpose specified.

Signed at Winnipeg, in the Province of Manitoba, this 28th day of May 1910.

JOHN DUNN.

In the presence of—
G. S. ROXBURGH,
J. K. ELKIN.

Copies of this patent may be obtained for five cents each, by addressing the "Commissioner of Patents, Washington, D. C."